United States Patent Office 3,630,867
Patented Dec. 28, 1971

3,630,867
PROCESS FOR PREPARING DICHLOROACETYL CHLORIDE
Karl Petz, Westheim, Germany, assignor to Farbwerke Hoechst Aktiengesellschaft vormals Meister Lucius & Bruning, Frankfurt am Main, Germany
No Drawing. Filed June 16, 1967, Ser. No. 646,500
Claims priority, application Germany, July 7, 1966, F 49,632
Int. Cl. C07c 51/58
U.S. Cl. 204—158 HE
8 Claims

ABSTRACT OF THE DISCLOSURE

Dichloroacetyl chloride prepared by oxidizing trichloroethylene with oxygen or an oxygen-containing gas at temperatures in the range of from 15° C. to the boiling point of trichloroethylene with exposure to short-wave light, whereby the formation of by-products is avoided to a considerable extent by adding secondary or tertiary aliphatic or aromatic amines, as such or in mixture, to the reaction mixture with or without interrupting the oxidation reaction, this process being carried out continuously or discontinuously with or without pressure being applied.

---

The present invention provides dichloroacetyl chloride and a process for preparing it.

It is known that pure trichloroethylene can be reacted by oxidation with oxygen partially to yield dichloroacetyl chloride. It is furthermore known that this reaction requires an intermediate step yielding trichloroethylene oxide. Thus, the oxidation of trichloroethylene provides, in addition to the gaseous by-products of hydrogen chloride, carbon monoxide and phosgene, a mixture of dichloroacetyl chloride and trichloroethylene oxide, which may, however, also contain more or less of chloral, the re-arrangement product of trichloroethylene oxide.

German Pat. No. 531,579 discloses a process wherein the trichloroethylene oxide portion of the oxidation mixture can be re-arranged by adding corresponding catalysts to yield either dichloroacetyl chloride or chloral: the use of organic nitrogen bases preferably leads to dichloroacetyl chloride whereas metal chlorides preferably provide chloral. Since, in every case, mixtures are obtained, the re-arrangement reaction has to be followed, if pure separate components are required, by further treatments for separating them. When a re-arrangement yielding dichloroacetyl chloride is intended, the process becomes, more-over, relatively expensive owing to the fact that a fractionated distillation has to be carried out prior to the re-arrangement.

Another drawback of all hitherto known processes for preparing dichloroacetyl chloride by oxidation of trichloroethylene resides in the fact that only very pure trichloroethylene can be used as a starting material. In German Pats. Nos. 531,579 and 759,963, this demand for purity is based on the allegation that anti-oxigenic impurities, in particular heavy-metal salts, preferably iron, have a detrimental effect on the reaction procedure. For example, when dichloroacetyl chloride is prepared according to the prior art, it is not possible to use commercial trichloroethylene the iron content of which, generally, ranges from 5 to 20 p.p.m., since gaseous decomposition products, chloral as well as a high-boiling and highly chlorinated oil are formed in considerable amounts during the oxidation.

I have now found that commercial trichloroethylene can nevertheless be used for preparing dichloroacetyl chloride and that the oxidation product need not even be distilled when operating according to the process of the invention which provides only small amounts of gaseous and practically no liquid nor solid by-products.

The present process consists in preparing dichloroacetyl chloride having a degree of purity exceeding 98%, by oxidizing trichloroethylene with oxygen in a liquid phase and with exposure to short-wave light, a process which comprises adding 0.0005 to 0.05% by weight (calculated on the trichloroethylene used) on an organic nitrogen base to the reaction product as soon as dichloroacetyl chloride and trichloroethylene oxide sum up to a range of from about 20 to 90% by weight, and then continuing the oxidation until a dichloroacetyl chloride content in the range of from 98 to 100% is reached.

The organic nitrogen base may be added to the oxidation mixture in such a manner that the oxidation procedure is interrupted by cutting the oxygen feed, then the base is added and finally the oxidation is continued. It is, however, also possible and especially advantageous to add the base without interrupting the oxidation reaction.

The base may be added immediately after the oxidation reaction has started, which is recognized by an exothermic heat tone, but it may also be added at any later moment during the oxidation procedure. To be sure that no undesired by-products such as chloral, are formed, it is advantageous, in the case of the oxidation being interrupted, to add the base at the moment when dichloroacetyl chloride and trichloroethylene oxide formed sum up to a range of from about 20 to 90, preferably 40 to 70% by weight. When the base is added without interrupting the oxidation reaction, it is advantageous to start adding the nitrogen base not later than at the moment when dichloroacetyl chloride and trichloroethylene oxide together make up about 70% by weight of the oxidation mixture. It is, therefore, especially advantageous to add the base at a dichloroacetyl chloride-trichloroethylene oxide-content in the range of from 20 to 70, preferably 30 to 70% by weight.

It is possible to add the organic nitrogen base all at once as well as over a prolonged period within the oxidation time. Since the addition of the base causes a strong evolution of heat, especially when considerable amounts of oxidation products are already present, it is advisable, especially when handling oxidation batches on an industrial scale, to add the base extremely slowly, for example by means of a fine-dosing pump.

A particularly advantageous embodiment of the invention consists in carrying out the oxidation, under the usual conditions, with oxygen or an oxygen-containing gas, for example air, at a temperature ranging from 15° C. to the boiling point of trichloroethylene, with exposure to short-wave light, possibly in the presence of catalysts such as chlorine or bromine, and, as soon as dichloroacetyl chloride and trichloroethylene oxide together are in the range of from about 30 to 70% by weight, adding the organic nitrogen base over a period of several hours. The oxidation may be regarded as being complete when the dichloroacetyl chloride content of the reaction product exceeds 98%.

Dichloroacetyl chloride prepared according to the process of the invention is obtained in a practically pure form so that a subsequent distillation is not necessary. The chloral content is less than 0.05% by weight. Small amounts of unreacted trichloroethylene may, if necessary, be easily topped off from the hot reaction product after the oxidation.

As a starting material for the process of the invention there is generally used trichloroethylene of a commercial quality, which may contain the usual stabilizers, for example phenols, and which, prior to its use, is advantageously filtered for eliminating solid impurities that may be present. Products having a higher degree of purity may, of course, also be used although their use does not involve an advantage.

The organic nitrogen bases used are secondary and tertiary amines preferably containing 2 to 12 carbon atoms in the molecule, for example dimethyl amine, diethyl amine, dibutyl amine, trimethyl amine, triethyl amine, tributyl amine, N-methylaniline, N,N-dimethylaniline, pyridine, piperidine, picolines, quinoline and mixtures of these amines, which are used in amounts ranging from 0.0005 to 0.05% by weight, preferably from 0.001 to 0.005% by weight, calculated on the amount of trichloroethylene used.

The process may be carried out without pressure or under pressure or partially under pressure and continuously as well as discontinuously.

Dichloroacetyl chloride prepared according to the process of the invention can be used as an intermediate for the synthesis of organic compounds and it can, generally, be processed directly further owing to its high degree of purity.

The following examples serve to illustrate the invention, but they are not intended to limit it thereto.

EXAMPLE 1

An enameled vessel having a capacity of 4 cubic metres, provided with a stirrer, a current interrupter, a gas feed pipe, two ultraviolet lamps as well as two lead condensers, was filled with 4,000 kilograms of commercial trichloroethylene. The trichloroethylene had an iron content of about 15 p.p.m. The spectrum analysis also revealed traces of chromium, copper, manganeses, molyddenum and lead. At 70° C. and under a pressure in the range of from 1 to 2 atmospheres gage, oxygen was blown through the trichloroethylene in an amount of 10 cubic metres per hour, with exposure to light and vigorous stirring. After a reaction period of 50 hours, the oxidation was interrupted, the contents of the vessel were cooled to about 20° C. and then 125 grams of pyridine was added thereto while vigorously stirring and cooling. The temperature of the oxidation product rose to 50° C. within 30 minutes and then decreased, thus showing that the rearrangement of the trichloroethylene oxide was terminated.

The gas chromatographic analysis of the trichloroethylene oxidate, prior to and after the re-arrangement, showed the following values:

Prior to re-arrangement:
   1.02% of unknown substance
   0.26% of unknown substance
   0.11% of chloroform
   13.18% of trichloroethylene
   0.00% of chloral
   10.18% of epoxide and
   75.25% of dichloroacetyl chloride After re-arrangement:
   1.18% of unknown substance
   0.21% of unknown substance
   0.10% of chloroform
   13.18% of trichloroethylene
   0.00% of chloral
   0.00% of epoxide and
   85.33% of dichloroacetyl chloride After the re-arrangement had taken place and the contents of the vessel had been heated again to 70° C., oxygen was injected in an amount of 6 cubic metres per hour for another 20 hours in order to complete the oxidation. The yield of dichloroacetyl chloride was 3,900 kilograms (88.6% of the theoretical yield). As shown by a gas chromatographic analysis, the product had the following degree of purity:

0.53% of unknown substance
0.13% of unknown substance
0.12% of chloroform
0.88% of trichloroethylene
0.00% of chloral
0.27% of unknown substance and
98.07% of dichloroacetyl chloride.

EXAMPLE 2

A flask with several necks, having a capacity of 2 litres, provided with a stirrer, a gas feed pipe, an ultraviolet lamp, a dropping funnel, a reflux condenser and a thermometer, was charged with 1,300 grams of commercial trichloroethylene. With exposure to light and vigorous stirring, oxygen was blown through the trichloroethylene at 70° C. After an oxidation period of 6 hours, a sample was taken from the reaction mixture without cutting the oxygen feed and was analyzed by gas chromatography. The values obtained were as follows:

1.16% of unknown substance
0.27% of unknown substance
0.10% of chloroform
28.75% of trichloroethylene
0.00% of chloral
16.08% of trichloroethylene oxide and
53.63% of dichloroacetyl chloride.

Immediately after the sample had been taken, 2.6 milliltres of pyridine were introduced dropwise over a period of 1 hour while the temperature of the contents of the flask was maintained at about 70° C. by cooling. The oxidation proceeded without interruption while the base was added. After a total reaction period of 17 hours, the oxidation was terminated and the final product had the following composition found by gas chromatography:

0.56% of unknown substance
0.41% of unknown substance
0.45% of chloroform
0.04% of trichloroethylene
0.00% of chloral
0.04% of unknown substance
0.08% of trichloroethylene oxide
98.23% of dichloroacetyl chloride and
0.20% of unknown substance.

The yield of dichloroacetyl chloride amounted to 92.3% of the theoretical yield.

What is claimed is:

1. In the process for the preparation of dichloroacetyl chloride which comprises oxidizing trichloroethylene with oxygen in the liquid phase and with exposure to shortwave light, the improvement which comprises obtaining said dichloroacetyl chloride having a purity in excess of 98% by adding from 0.0005 to 0.05% by weight calculated on the trichloroethylene used of a secondary or tertiary amine free of carbon to carbon unsaturation, said amine having from 2 to 12 carbon atoms, to the reaction mixture, as soon as the total amount of dichloroacetyl chloride and trichloroethylene oxide formed during the reaction is in the range of from about 20 to 90% by weight of the reaction mixture, and then continuing the oxidation until a dichloroacetyl chloride content in the range of from 98 to 100% of the reaction mixture is reached.

2. The process of claim 1, wherein the amine is added not later than at the moment when, in the reaction mixture, the dichloroacetyl chloride and trichloroethylene oxide formed sum up to about 70% by weight of the reaction mixture.

3. The process of claim 1, wherein the amine is added when, in the reaction mixture, the dichloroacetyl chloride and trichloroethylene oxide formed sum up to a range of from 30 to 70% by weight.

4. The process according to claim 1, wherein the amine is dimethylamine, diethylamine, dibutylamine, trimethylamine, triethylamine, tributylamine, N-methylaniline, N,N-dimethylaniline, pyridine, piperidine, picolines, quinoline or mixtures thereof.

5. The process of claim 1, wherein the oxidation reaction is interrupted while the amine is being added and the oxidation reaction is begun again after the amine has been added.

6. The process of claim 1, wherein the oxidation reaction is continued while the amine is being added.

7. The process of claim 1 wherein all the amine is added at one time.

8. The process of claim 1, wherein the amine is added over a prolonged period of time.

References Cited
UNITED STATES PATENTS

| | | | |
|---|---|---|---|
| 3,509,210 | 4/1970 | Gaertner | 260—544 |
| 2,292,129 | 8/1942 | Kirkbride | 204—163 |

LORRAINE A. WEINBERGER, Primary Examiner

E. J. GLEIMAN, Assistant Examiner

U.S. Cl. X.R.

260—544 Y